United States Patent [19]

Bannon

[11] Patent Number: 4,747,947

[45] Date of Patent: May 31, 1988

[54] SEPARATOR SKIMMER FOR SURGE VESSELS

[75] Inventor: Robert P. Bannon, Houston, Tex.

[73] Assignee: Shell Oil Company, Houston, Tex.

[21] Appl. No.: 59,187

[22] Filed: Jun. 11, 1987

Related U.S. Application Data

[63] Continuation of Ser. No. 848,193, Apr. 4, 1986, abandoned.

[51] Int. Cl.[4] ............................................. B01D 21/02
[52] U.S. Cl. .................................... 210/522; 210/539; 210/540
[58] Field of Search ................................ 210/513–515, 210/519, 521, 522, 525, 532.1, 533–540, 320, 251, 242.3

[56] References Cited

U.S. PATENT DOCUMENTS

| | | | |
|---|---|---|---|
| 3,752,318 | 8/1973 | Deroven et al. | 210/251 |
| 3,862,040 | 1/1975 | Preus et al. | 210/253 |
| 4,247,312 | 1/1981 | Thakur et al. | 210/522 |
| 4,396,508 | 8/1983 | Broughton | 210/522 |
| 4,564,449 | 1/1986 | Kampers | 210/242.3 |

Primary Examiner—Frank Sever

[57] ABSTRACT

An apparatus for separating liquids having different densities, such as a hydrocarbon layer floating on a liquid surface in vertically surging body of liquid. A surge vessel receives the fluid to be separated, via an inlet located at or near the bottom of the vessel. The vessel is provided with a collection means positioned above the liquid inlet and maximum liquid level such as a baffle contained within the vessel for collecting the lighter fluid phase. Changes in the vertical displacement of the liquid body within the surge vessel provide the driving force for the collection means to operate. For vessels having less frequent level changes, the collection device may also include a container, such as a box, positioned below the baffle. As the liquid level in the surge vessel rises, some of the lighter fluid phase will be trapped under the baffle. The lighter fluid phase is then pushed to a collection device located outside the surge vessel, such as a tank, along with the heavier phase by the rising body of fluid within the surge vessel. Since the apparatus does not contain moving parts, frequent maintenance is not required.

29 Claims, 1 Drawing Sheet

SEPARATOR SKIMMER FOR SURGE VESSELS

This is a continuation of application Ser. No. 848,193, filed Apr. 4, 1986 now abandoned.

BACKGROUND OF THE INVENTION

This invention relates to an apparatus for separating liquids having different densities, such as a hydrocarbon layer floating on a fluid surface.

Many chemical and refining processes use surge vessels which may contain small amounts of an immiscible second liquid phase; e.g., oil and water. If the minor phase is the heavy phase, it can be easily collected and removed separately, or it may be allowed to pass along with the light phase with no special provision needed to avoid accumulation. This is not the case if the minor phase is the light phase. By the very nature of surge vessels, the outlet is at or near the bottom of the vessel. Light phase tends to separate and accumulate in the vessel. Since the liquid level fluctuates during operation (again, the very nature of surge vessels) removal of the upper phase as a separate stream is necessary to avoid slugs of upper phase in the outlet line.

Removal of upper phase presents difficulties. A float can be used to position an outlet pipe to draw off upper phase. However, the moveable parts needed for this type of device are generally considered to be not very reliable for process vessels that operate for several years between turnarounds and floats are usually unacceptable on that basis. The most common method used is to periodically skim the vessel by adjusting liquid level to be in the proper relationship to a skimming nozzle on the side of the vessel. Upper phase is then drawn off through the skimming nozzle. This method is awkward because it requires (1) adjustment of vessel inventory to get the level to the proper position, (2) additional gauge glasses on the vessel to detect the presence and amount of upper phase and (3) the skimming to be done manually.

Mechanical skimmers frequently require maintenance and attention for effective operation, thereby resulting in reduced efficiency in the event of a malfunction.

Applicant is not aware of any prior art which, in his judgment as one skilled in this particular art, would anticipate or render obvious the present invention. However, for the purpose of fully developing the background of the invention, and establishing the state of requisite art, the following art is set forth: U.S. Pat. Nos. 3,752,318; 4,564,449; 3,862,040.

SUMMARY OF THE INVENTION

The present invention is directed towards an apparatus for separating liquids having different densities, such as hydrocarbons and water. A surge vessel is provided with an inlet port located in the side wall at or near the lower end of the surge vessel to receive the fluid. A first outlet port located at the lower end of the surge vessel allows the heavier fluid phase to be drained. Vapors from fluid contained in the surge vessel may be discharged by a second outlet port located at the upper end of the surge vessel.

A collection device or baffle mounted on the interior wall of the surge vessel collects at least a portion of the lighter fluid phase thereunder from time to time during normal operations. Changes in the vertical displacement of the liquid body within the surge vessel provide the driving force for the collecting means to operate the separator apparatus of the present invention. A third outlet port located through the side wall of the surge vessel and below the collection device allows the lighter fluid phase to flow from the surge vessel to a collection vessel.

As the liquid level in the surge vessel rises from a point below the collection device to a point above it, some of the vapor and lighter fluid phase will be trapped under this collection device. This vapor and lighter fluid phase will be pushed to a collection vessel or tank along with the heavier phase by the rising body of liquid within the surge vessel. When the liquid level falls in the surge vessel, the level in the collection vessel will also fall until it reaches the elevation fixed by the design of the flow conduit or connection between the two vessels. This elevation must be somewhere below the top of the collection vessel so there is some vapor space in the collection vessel when the surge vessel liquid level is low. Also, this elevation must be above the bottom of the collection vessel so that some liquid is trapped in the vessel when the surge vessel liquid level drops.

The collection vessel may be a completely enclosed vessel such as a container having a fixed volume so as to require drainage, at least periodically. As the surge vessel liquid level cycles transfer more lighter fluid phase to the collection vessel, the collection vessel may be drained either manually or automatically with the proper instrumentation.

For vessels having less frequent level changes, the collection device may include a baffle mounted on the interior of the surge vessel and a container, such as a box, positioned below the baffle and the third outlet port means to the collection vessel. When the liquid level in the surge vessel reaches the top of the box, the liquid overflows into the box. Most of the lighter fluid phase flowing into the box will be trapped under the baffle as the level continues to rise, and it will be transferred to the collection vessel as before. When the surge vessel liquid level drops below the box, one or more siphon pipes empty the box in preparation for the next cycle. Other devices, such as a check valve on the bottom of the box or an external drain with the solenoid valve, could be used to drain the box. However, a siphon is preferred for its simplicity and the absence of moving parts.

One advantage of the present invention is that the apparatus removes a lighter immiscible liquid phase from a second fluid phase, e.g., oil and water.

Another advantage of the present invention is that the apparatus does not require frequent maintenance or attention for effective operation since the apparatus contains no moving parts.

The various features of novelty which characterize the invention are pointed out with particularity in the claims forming a part of this disclosure. For a better understanding of the invention, its operating advantages and specific object obtained by its uses, reference may be made to the accompanying drawings and descriptive matter in which there are illustrated preferred embodiments of the invention.

DESCRIPTION OF THE PREFERRED EMBODIMENT

Figure 1:
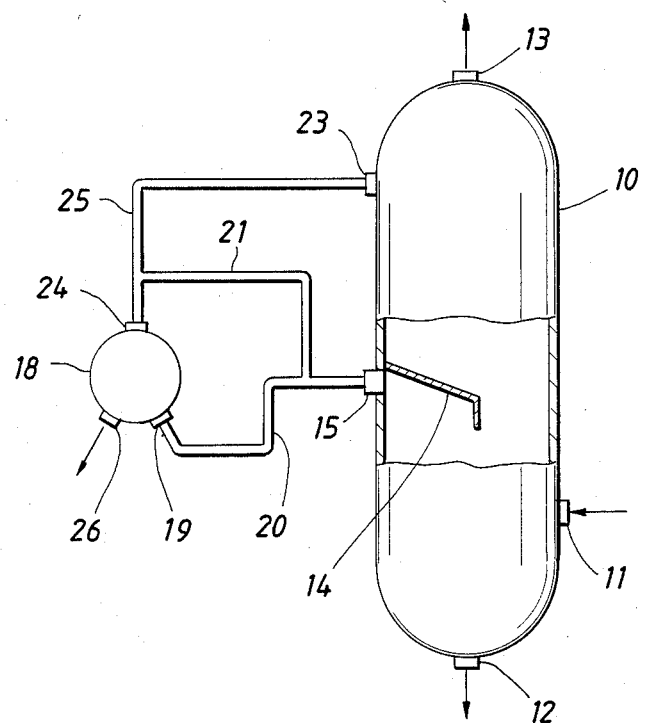
FIG. 1 is a diagrammatic view of the separator apparatus preferred for relatively frequent level changes.

Referring to FIG. 1 of the drawings, an apparatus for separating a lighter fluid phase from a heavier fluid phase may include first containing means 10, hereinafter referred to as a surge vessel. A first inlet opening means 11 located in the side wall of the surge vessel 10 at or near the lower end of the surge vessel receives the fluid. A first outlet opening means 12 located at the lower end of the surge vessel 10 permits discharging of the heavier fluid phase. A second outlet opening means 13 located at the upper end of the surge vessel 10 is provided for introducing or discharging vapor from the surge vessel 10. Collecting means, such as a baffle 14 mounted on the interior wall of the surge vessel 10, collects at least a portion of the lighter fluid phase thereunder from time to time during normal operations. A third outlet opening means 15 is located through the side wall of the surge vessel 10 and below the baffle 14. The baffle 14 collects the lighter fluid phase and transfers it to a second containing means 18, hereinafter referred to as collection vessel, through a first conduit 20 connecting the third outlet opening means 15 of the surge vessel 10 with the second inlet port means 19 of the collection vessel 18.

Changes in the surge vessel 10 level provide the driving force for the baffle 14 to work. As the liquid level rises from a point below the baffle 14 to a point above it, some vapor and lighter fluid phase will be trapped under the baffle 14. The rising liquid will drive the vapor and lighter fluid phase to the collection vessel 18 along with some heavier fluid phase if the volume of lighter phase is not sufficient to fill the collection vessel 18. When the liquid level falls in the surge vessel 10, the liquid level in the collection vessel 18 will also fall until it reaches the elevation fixed by the design of a fluid discharge connection 20 between the two vessels 10 and 18. This elevation or point of connection must be somewhere below the top of the collector vessel 18 so there is some vapor space when the surge vesel 10 level is low. Also, this point must be above the bottom of the collector vessel 18 so some liquid is trapped in the vessel 18 when the surge vessel level drops. The collection vessel 18 is typically a container having a fixed volume so as to require drainage, at least periodically.

Means for transporting vapor so as to equalize pressure between the collection vessel 18 and the surge vessel 10 may comprise second conduit 25 connecting a fourth outlet opening means 24 located through the upper wall of the collection vessel 18 with a third inlet opening means 23 located in the side wall of the surge vessel 10 and above the maximum liquid level maintained in the surge vessel 10 during normal operations.

Preferably, another conduit 21 in communication with the first conduit 20 and second conduit 25 is provided which allows for the transfer of vapor trapped under the baffle 14 on the rising fluid level from the first conduit 20 to the second conduit 25. Alternatively, the conduit 21 may be in communication with the surge vessel 10 at an elevation above the liquid level maintained in the surge vessel 10 during normal operations so as to transport vapor from the first conduit 20 to the surge vessel 10. As another alternative, the conduit 21 may be completely contained within surge vessel 10 extending upward from the top of baffle 14 to a point above the maximum fluid level.

The collection vessel 18 may be provided with first draining means 26 for discharging the lighter fluid phase. This drain means may be controlled manually or automatically with the proper instrumentation, in a manner well known to the art.

Figure 2:
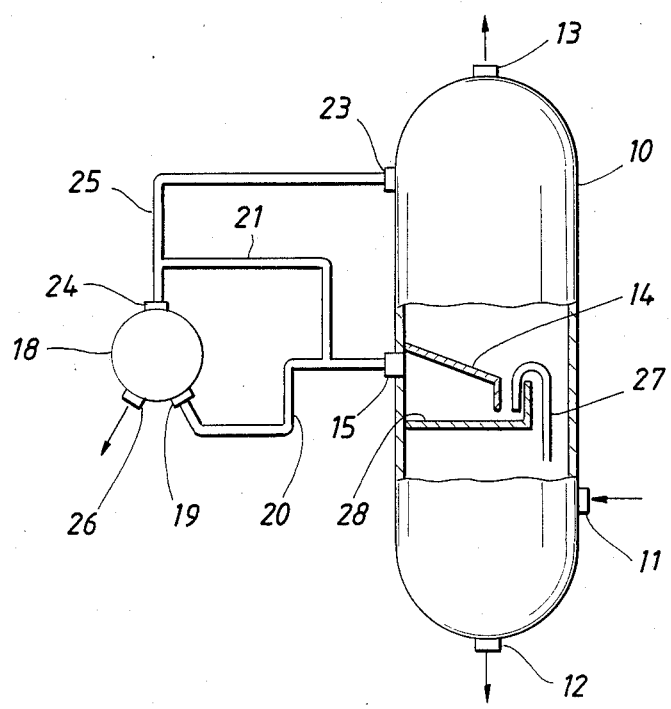
FIG. 2 is a diagrammatic view of the separator apparatus designed for less frequent liquid level changes.

For vessels having less frequent level changes, the surge vessel 10 may include a baffle 14 mounted on the interior of the surge vessel 10 and another container 28, such as a box, positioned below the baffle 14 and third outlet port 15 as shown in FIG. 2. When the liquid level in the surge vessel 10 reaches the top of the container 28, it overflows into the container. Most of the lighter fluid phase flowing into the container 28 will be trapped under the baffle as the level continues to rise, and it will be transferred to the collection vessel 18 as before. When the surge vessel 10 level drops below the container 28, one or more siphon pipes 27 empties the container 28 in preparation for the next cycle. Other devices, such as a check valve (not shown) on the bottom of the container 28 or an external drain with a solenoid valve (not shown), could be used to drain the box.

Thus, it can be seen from the above description of the preferred embodiment that the objective of collecting a lighter immiscible fluid phase from a two-phase fluid is accomplished while the level of the body of liquid within the surge vessel is changing.

What is claimed is:

1. An apparatus for separating a lighter liquid phase from a heavier liquid phase in a vertically surging body of liquid comprising:

means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter fluid phase thereunder from time to time during normal surge operations, said collecting means operatively driven by changes in vertical displacement of the liquid body within the first containing means;

third outlet opening means located through the side wall of said first containing means and below said collecting means;

second containing means located outside of said first containing means, said second containing means having upper and lower portions;

second inlet opening means located through the wall of said second containing means; and a first conduit connecting said third outlet opening means to said second inlet opening means of said second containing means for transporting said liquid from said first containing means to said second containing means, an upper portion of said first conduit positioned at an elevation between the upper and lower portions of said second containing means.

2. The apparatus of claim 1 wherein said second containing means includes first draining means carried by said second containing means for discharging said lighter liquid phase.

3. The apparatus of claim 1 wherein said apparatus includes transporting means for transporting vapor between said second containing means and said first containing means.

4. The apparatus of claim 3 wherein said transporting means comprises:
fourth outlet opening means through the upper wall of said second containing means for transporting vapor between said second containing means and said first containing means,
third inlet opening means located through the side wall of said first containing means and above a maximum liquid level maintained in said first containing means during normal operations, and
a second conduit connecting said fourth outlet opening means to said third inlet opening means for transporting said vapor between said second containing means and said first containing means.

5. The apparatus of claim 4 wherein said transporting means includes a third conduit connecting said first conduit and said second conduit for transporting vapor between said first conduit and said second conduit.

6. The apparatus of claim 4 wherein said transporting means includes a third conduit connecting said first conduit to said first containing means at an elevation above the maximum liquid level maintained in said first containing means during normal operations for transporting vapor between said first conduit and said first containing means.

7. The apparatus of claim 1 wherein said collecting means includes a baffle carried by the interior wall of said first containing means and being fixedly positioned thereto for trapping said lighter liquid phase.

8. The apparatus of claim 7 including a third containing means within said first containing means and being located below said baffle and said third outlet opening means for collecting said lighter liquid phase.

9. The apparatus of claim 7 wherein said collecting means includes third containing means located below said baffle therein and below said third outlet opening means for collecting said lighter liquid phase.

10. The apparatus of claim 9 wherein said third containing means includes second draining means in fluid communication between the space adjacent the bottom of said third containing means and the space within said first containing means.

11. The apparatus of claim 9 wherein said third containing means includes second draining means in communication between the space adjacent the bottom of said third containing means and the space external to the first containing means.

12. The apparatus of claim 1 wherein said transporting means includes a third conduit within the first containing means, said transporting means being connected to said baffle and extending upwardly therefrom to a position near the roof of said first containing means and above the maximum fluid level.

13. An apparatus for separating a lighter liquid phase from a heavier liquid phase in a vertically surging body of liquid comprising:
means for collecting a lighter immiscible fluid phase from a two-phase fluid while the level of a body of fluid within a surge vessel is changing; including, first containing means;
first inlet opening means located in the side wall of said first containing means by which the two-phase liquid enters said first containing means;
first outlet opening means located at the lower end of said first containing means for discharging a heavier liquid phase;
second outlet opening means located at the upper end of said first containing means;
collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;
third outlet opening means located through the side wall of said first containing means and below said collecting means;
second containing means located outside of said first containing means, said second containing means having upper and lower portions, said second containing means includes first draining means carried by said second containing means for discharging said lighter liquid phase;
second inlet opening means located through the wall of said second containing means;
a first conduit connecting said third outlet opening means to said second inlet opening means of said second containing means for transporting said liquid from said first containing means to said second containing means, an upper portion of said first conduit positioned at an elevation between the upper and lower portions of said second containing means;
transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means during normal operations, a second conduit connecting said fourth outlet opening means for transporting said vapor between said second containing means and said first containing means, and a third conduit connecting said first conduit and said second conduit for transporting vapor between said first conduit and said second conduit; and
a third containing means within said first containing means and being located below said baffle and said third outlet opening means for collecting said lighter liquid phase, said third containing means includes second draining means in communication between the space adjacent the bottom of said third containing means and the space within said first containing means.

14. An apparatus for separating a lighter liquid phase from a heavier liquid phase in a vertically surging body of liquid comprising:
means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;

third outlet opening means located through the side wall of said first containing means and below said collecting means;

second containing means located outside of said first containing means, said second containing means having upper and lower portions, said second containing means includes first draining means carried by said second containing means for discharging said lighter liquid phase;

second inlet opening means located through the wall of said second containing means;

a first conduit connecting said third outlet opening means to said second inlet opening means of said second containing means for transporting said liquid from said first containing means to said second containing means, an upper portion of said first conduit positioned at an elevation between the upper and lower portions of said second containing means;

transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means, third inlet opening means located through the side wall of said first containing means and above a maximum liquid level maintained in said first containing means during normal operations, a second conduit connecting said fourth outlet opening means to said third inlet opening means for transporting said vapor between said second containing means and said first containing means, and a third conduit connecting said first conduit and said first containing means for transporting vapor between said first conduit and said first containing means at an elevation above the maximum liquid level maintained in said first containing means during normal operations; and a third containing means within said first containing means and being located below said baffle and said third outlet opening means for collecting said lighter liquid phase, said third containing means includes second draining means in communication between the space adjacent the bottom of said third containing means and the space within said first containing means.

15. An apparatus for separating a lighter liquid phase from a heavier liquid phase in a vertically surging body of liquid comprising:

means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;

third outlet opening means located through the side wall of said first containing means and below said collecting means;

second containing means located outside of said first containing means having upper and lower portions, said second containing means includes first draining means carried by said second containing means for discharging said lighter liquid phase;

second inlet opening means located through the wall of said second containing means;

a first conduit connecting said third outlet opening means to said second inlet opening means of said second containing means for transporting said liquid from said first containing means to said second containing means, an upper portion of said first conduit positioned at an elevation between the upper and lower portions of said second containing means;

transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means during normal operations, a second conduit connectng said fourth outlet opening means to said third inlet opening means for transporting said vapor between said second containing means and said first containing means, and a third conduit within the first containing means, said third conduit being connected to said baffle and extending upwardly therefrom to a position near the roof of said first containing means and above the maximum liquid level during normal operations; and a third containing means within said first containing means and being located below said baffle and said third outlet opening means for collecting said lighter liquid phase, said third containing means includes second draining means in communication between the space adjacent the bottom of said third containing means and the space within said first containing means.

16. An apparatus for separating a lighter liquid phase from a heavier liquid phase in a vertically surging body of liquid comprising:
  means for collecting a lighter immiscible fluid phase from a two-phase fluid while the level of a body of fluid within a surge vessel is changing; including,
  first containing means;
  first inlet opening means located in the side wall of said first containing means by which the two-phase liquid enters said first containing means;
  first outlet opening means located at the lower end of said first containing means for discharging a heavier liquid phase;
  second outlet opening means located at the upper end of said first containing means;
  collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;
  third outlet opening means located through the side wall of said first containing means and below said collecting means;
  second containing means located outside of said first containing means, said second containing means having upper and lower portions, said second containing means includes first draining means carried by said second containing means for discharging said lighter liquid phase;
  second inlet opening means located through the wall of said second containing means;
  a first conduit connecting said third outlet opening means to said second inlet opening means of said second containing means for transporting said liquid from said first containing means to said second containing means, an upper portion of said first conduit positioned at an elevation between the upper and lower portions of said second containing means;
  transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means during normal operations, a second conduit connecting said fourth outlet opening means to said third inlet opening means for transporting said vapor between said second containing means and said first containing means, and a third conduit within the first containing means, said third conduit being connected to said baffle and extending upwardly therefrom to a position near the roof of said first containing means and above the maximum liquid level during normal operations; and a third containing means within said first containing means and being located below said baffle and said third outlet opening means for collecting said lighter liquid phase, said third containing means includes second draining means in communication between the space adjacent the bottom of said third containing means and the space within said first containing means.

17. An apparatus for separating a lighter liquid phase from a heavier liquid phase in a vertically surging body of liquid comprising:
  means for collecting a lighter immiscible fluid phase from a two-phase fluid while the level of a body of fluid within a surge vessel is changing; including,
  first containing means;
  first inlet opening means located in the side wall of said first containing means by which the two-phase liquid enters said first containing means;
  first outlet opening means located at the lower end of said first containing means for discharging a heavier liquid phase;
  second outlet opening means located at the upper end of said first containing means;
  collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;
  third outlet opening means located through the side wall of said first containing means and below said collecting means;
  second containing means located outside of said first containing means, said second containing means having upper and lower portions, said second containing means includes first draining means carried by said second containing means for discharging said lighter liquid phase;
  second inlet opening means located through the wall of said second containing means;
  a first conduit connecting said third outlet opening means to said second inlet opening means of said second containing means for transporting said liquid from said first containing means to said second containing means, an upper portion of said first conduit positioned at an elevation between the upper and lower portions of said second containing means;
  transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means during normal operations, a second conduit connecting said fourth outlet opening means to said third inlet opening means for transporting said vapor between said second containing means and said first containing means, and a third conduit connecting said first conduit and said second conduit for transporting vapor between said first conduit and said second conduit; and a third containing means within said first containing means and being located below said baffle and said third outlet opening means for collecting said lighter liquid phase, said third containing means includes second draining means in communication between the space adjacent the bottom of said third containing means and the space external to the first containing means.

18. An apparatus for separating a lighter liquid phase from a heavier liquid phase in a vertically surging body of liquid comprising:

means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;

third outlet opening means located through the side wall of said first containing means and below said collecting means;

second containing means located outside of said first containing means, said second containing means having upper and lower portions, said second containing means includes first draining means carried by said second containing means for discharging said lighter liquid phase;

second inlet opening means located through the wall of said second containing means;

a first conduit connecting said third outlet opening means to said second inlet opening means of said second containing means for transporting said liquid from said first containing means to said second containing means, an upper portion of said first conduit positioned at an elevation between the upper and lower portions of said second containing means;

transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means during normal operations, a second conduit connecting said fourth outlet opening means to said third inlet opening means for transporting said vapor between said second containing means and said first containing means, and a third conduit connecting said first conduit and said first containing means for transporting vapor between said first conduit and said first containing means at an elevation above the maximum liquid level maintained in said first containing means during normal operations; and a third containing means within said first containing means and being located below said baffle and said third outlet opening means for collecting said lighter liquid phase, said third containing means includes second draining means in communication between the space adjacent the bottom of said third containing means and the space external to the first containing means.

19. An apparatus for separating a lighter liquid phase from a heavier liquid phase in a vertically surging body of liquid comprising:

means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;

third outlet opening means located through the side wall of said first containing means and below said collecting means;

second containing means located outside of said first containing means, said second containing means having upper and lower portions, said second containing means includes first draining means carried by said second containing means for discharging said lighter liquid phase;

second inlet opening means located through the wall of said second containing means;

a first conduit connecting said third outlet opening means to said second inlet opening means of said second containing means for transporting said liquid from said first containing means to said second containing means, an upper portion of said first conduit positioned at an elevation between the upper and lower portions of said second containing means;

transporting means for transporting vapor between said second containing means and said first containing means, said transporting means includes fourth outlet opening means through the upper wall of said second containing means for transporting vapor between said second containing means and said first containing means, third inlet opening means located through the side wall of said first containing means and above a maximum liquid level maintained in said first containing means during normal operations, a second conduit connecting said fourth outlet opening means to said third inlet opening means for transporting said vapor between said second containing means and said first containing means, and a third conduit within the first containing means, said third conduit being connected to said baffle and extending upwardly therefrom to a position near the roof of said first containing means and above the maximum liquid level during normal operations; and a third containing means within said first containing means and being located below said baffle and said third outlet opening means for collecting said lighter liquid phase, said third containing means includes second drainage means in communication between the space adjacent the bottom of said third containing means and the space external to the first containing means.

20. An apparatus for separating a lighter liquid phase from a heavier liquid phase in a vertically surging body of liquid comprising:

means for collecting a lighter immiscible fluid phase from a two-phase fluid while the level of a body of fluid within a surge vessel is changing; including, first containing means;

first inlet opening means located in the side wall of said first containing means by which the two-phase liquid enters said first containing means;

first outlet opening means located at the lower end of said first containing means for discharging a heavier liquid phase;

second outlet opening means located at the upper end of said first containing means;

collecting means mounted on the interior wall of said first containing means above a maximum liquid level for collecting at least a portion of said lighter liquid phase thereunder from time to time during normal surge operations, said collecting means operatively driven by changes in vertical displacement of the liquid body within said first containing means, said collecting means includes a baffle fixedly positioned thereto for trapping said lighter liquid phase;

third outlet opening means located through the side wall of said first containing means and below said collecting means;

second containing means located outside of said first containing means having upper and lower portions, said second containing means includes first draining means carried by said second containing means for discharging said lighter liquid phase;

second inlet opening means located through the wall of said second containing means;

a first conduit connecting said third outlet opening means to said second inlet opening means of said second containing means for transporting said liquid from said first containing means to said second containing means, an upper portion of said first conduit positioned at an elevation between the upper and lower portions of said second containing means;

transporting means for transporting vapor between said second containing means and said first containing means, said transporting means includes fourth outlet opening means through the upper wall of said second containing means for transporting vapor between said scond containing means and said first containing means, third inlet opening means located through the side wall of said first containing means and above a maximum liquid level maintained in said first containing means during normal operations, a second conduit connecting said fourth outlet opening means to said third inlet opening means for transporting said vapor between said second containing means and said first containing means, and a third conduit within the first containing means, said third conduit connected to said baffle and extending upwardly therefrom to a position near the roof of said first containing means and above the maximum liquid level during normal operations; and a third containing means within said first containing means and being located below said baffle and said third outlet opening means for collecting said lighter liquid phase, said third containing means includes second draining means in communication between the space adjacent the bottom of said third containing means and the space external to the first containing means.

21. A method for separating a lighter liquid phase from a heavier liquid phase in a vertically surging body of liquid comprising:

collecting a lighter immiscible fluid phase from a two-phase liquid fluid while the level of a body of fluid within a surge vessel is changing, by providing a baffle operatively driven by changes in vertical displacement of a liquid body within a first containing means and extending over at least a portion of of a surface of said surging body of liquid;

introducing the two-phase liquid into said first containing means;

discharging said heavier liquid phase from the lower end of said first containing means;

discharging vapor of said liquid from the upper end of said first containing means;

increasing the liquid level in said first containing means from a point below said baffle to a point above said baffle;

collecting under said baffle at least a portion of said lighter liquid phase and vapor during normal surge operations;

transporting the collected liquid and vapor from said first containing means to a second containing means through a conduit at an elevation below the top of said second contai8ning means and above the bottom of said second containing means to transport said liquid and vapor;

discharging said lighter liquid pahse from said second containing means; and transporting vapor between said second containing means and said first containing means.

22. A method for separating a lighter liquid phase from a heavier liquid phase in a vertically surging body of liquid comprising:

collecting a lighter immiscible fluid phase from a two-phase fluid while the level of a body of fluid within a surge vessel is changing, by:

providing a baffle operatively driven by changes in vertical displacement of a liquid body within a first containing means and extending over at least a portion of of a surface of said surging body of liquid;

providing a container positioned below said baffle and within said first containing means;

introducing the two-phase liquid into said first containing means;

discharging said heavier liquid phase from the lower end of said first containing means;

discharging vapor of said liquid from the upper end of said first containing means;

increasing the liquid level in said first containing means from a point below said baffle to a point above said baffle;

collecting under said baffle at least a portion of said lighter liquid phase and vapor during normal surge operations within said container and under said baffle; and transporting the collected liquid and vapor from said first containing means to a second containing means through a conduit at an elevation below the top of said second containing means and above the bottom of said second containing means to transport said liquid and vapor.

23. The method of claims 21 or 22 including discharging said lighter liquid phase from said second containing means.

24. The method of claims 21 or 22 including transporting vapor between said second containing means and said first containing means.

25. The method of claim 22 including draining the container into said first containing means as the liquid level drops below said container in said first containing means.

26. A method for separating a lighter liquid phase from a heavier liquid phase in a vertically surging body of liquid comprising:

collecting a lighter immiscible fluid phase from a two-phase fluid while the level of a body of fluid within a surge vessel is changing, by:

providing collecting means operatively driven by changes in vertical displacement of a liquid body within a first containing means and extending over at least a portion of of a surface of said surging body of liquid;

introducing the two-phase liquid into said first containing means;

discharging said heavier liquid phase from the lower end of said first containing means;

discharging vapor of said liquid from the upper end of said first containing means;

increasing the liquid level in said first containing means from a point below said collecting means to a point above said collecting means;

collecting at least a portion of said lighter liquid phase and vapor during normal surge operations;

transporting the collected liquid and vapor from said first containing means to a second containing means through a conduit at an elevation below the top of said second containing means and above the bottom of said second containing means to transport said liquid and vapor;

discharging said lighter liquid phase from said second copntaining means; and transporting vapor between said second containing means and said first containing means.

27. A method for separating a lighter liquid phase from a heavier liquid phase in a vertically surging body of liquid comprising:

collecting a lighter immiscible fluid phase from a two-phase fluid while the level of a body of fluid within a surge vessel is changing, by:

providing collecting means operatively driven by changes in vertical displacement of a liquid body within a first containing means and extending over at least a portion of of a surface of said surging body of liquid;

introducing the two-phase liquid into said first containing means;

discharging said heavier liquid phase from the lower end of said first containing means;

discharging vapor of said liquid from the upper end of said first containing means;

increasing the liquid level in said first containing means from a point below said collecting means to a point above said collecting means;

collecting at least a portion of said lighter liquid phase and vapor during normal surge operations; and transporting the collected liquid and vapor from said first containing means to a second containing means through a conduit at an elevation below the top of said second containing means and above the bottom of said second containing means to transport said liquid and vapor.

28. The method of claim 27 including discharging said lighter liquid phase from said second containing means.

29. The method of claim 27 including transporting vapor between said second containing means and said first containing means.

* * * * *